(12) United States Patent
Morford

(10) Patent No.: US 6,929,108 B2
(45) Date of Patent: Aug. 16, 2005

(54) SELF-LUBRICATING RELEASE BEARING HOUSING

(75) Inventor: Ronald B. Morford, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/136,672

(22) Filed: May 1, 2002

(65) Prior Publication Data

US 2003/0205441 A1 Nov. 6, 2003

(51) Int. Cl.⁷ .............................................. F16D 23/14
(52) U.S. Cl. ..................................... 192/98; 192/99 S
(58) Field of Search ................................ 192/98, 99 S, 192/110 B, 85 C, 91 R

(56) References Cited

U.S. PATENT DOCUMENTS

| | | | | |
|---|---|---|---|---|
| 1,912,101 A | * | 5/1933 | Short | 192/98 |
| 2,354,621 A | * | 7/1944 | Spase | 192/98 |
| 2,876,882 A | * | 3/1959 | Kelleigh | 192/98 |
| 3,401,779 A | * | 9/1968 | Puidokas | 192/98 |
| 3,632,459 A | * | 1/1972 | Klauer | 216/100 |
| 3,926,286 A | * | 12/1975 | Johnson | 192/41 S |
| 4,117,916 A | | 10/1978 | Baker | |
| 4,225,248 A | * | 9/1980 | Para | 366/251 |
| 4,327,951 A | | 5/1982 | Arrowsmith et al. | |
| 4,351,427 A | | 9/1982 | Miyahara | |
| 4,361,367 A | | 11/1982 | Statz | |
| 4,482,041 A | | 11/1984 | Ladin | |
| 4,534,458 A | | 8/1985 | Ladin | |
| 4,541,510 A | | 9/1985 | Itoh et al. | |
| 4,566,578 A | | 1/1986 | Leigh-Monstevens et al. | |
| 4,601,592 A | | 7/1986 | Jatczak et al. | |
| 4,742,902 A | | 5/1988 | Leigh-Monstevens | |
| 5,092,440 A | * | 3/1992 | Nakano | 192/55.1 |
| 5,120,091 A | | 6/1992 | Nakagawa | |
| 5,120,140 A | | 6/1992 | Nakagawa et al. | |
| 5,156,248 A | * | 10/1992 | Caron | 192/98 |
| 5,373,927 A | | 12/1994 | Gochenour et al. | |
| 5,704,718 A | | 1/1998 | Mori et al. | |
| 5,762,423 A | | 6/1998 | Mori et al. | |
| 5,980,819 A | | 11/1999 | Nakagawa et al. | |
| 6,102,181 A | * | 8/2000 | Lepard et al. | 192/98 |
| 6,179,470 B1 | | 1/2001 | Huddleston et al. | |
| 6,311,818 B1 | * | 11/2001 | Cole et al. | 192/99 S |
| 6,446,778 B1 | * | 9/2002 | Cole et al. | 192/98 |

FOREIGN PATENT DOCUMENTS

| | | | |
|---|---|---|---|
| FR | 2 691 771 A1 | * | 12/1993 |
| GB | 1 495 775 | * | 12/1977 |
| GB | 2 096 262 | | 10/1982 |
| JP | 62-242132 A | * | 10/1987 |

* cited by examiner

Primary Examiner—Rodney H. Bonck
(74) Attorney, Agent, or Firm—Cohen, Pontani, Lieberman & Pavane

(57) ABSTRACT

A clutch assembly for a mobile vehicle clutch includes a sleeve axially disposed on a shaft and engaged to actuate clutch springs or levers for disengaging a clutch. The sleeve is attached to a clutch release bearing that is moved axially along the input shaft by a clutch fork. A contact surface of the release fork engages a contact surface disposed on lugs of the clutch release bearing. At least one of the contact surfaces includes a self-lubricating material to reduce friction between the release for and the clutch release bearing during actuation of the clutch assembly.

23 Claims, 4 Drawing Sheets

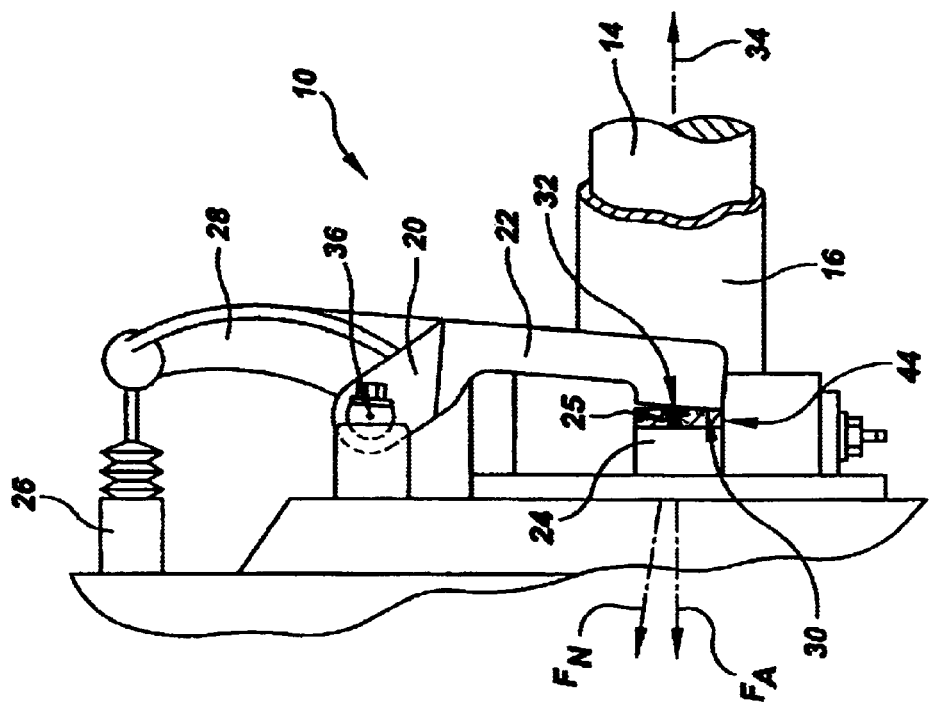
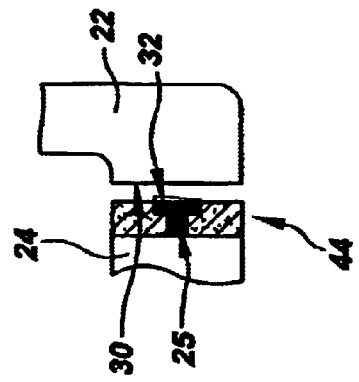
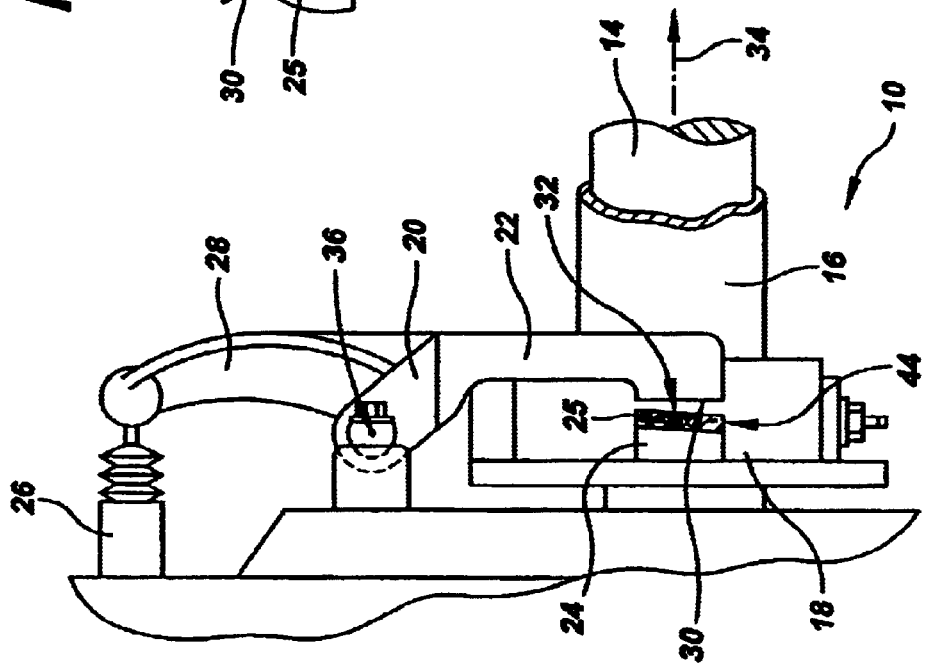

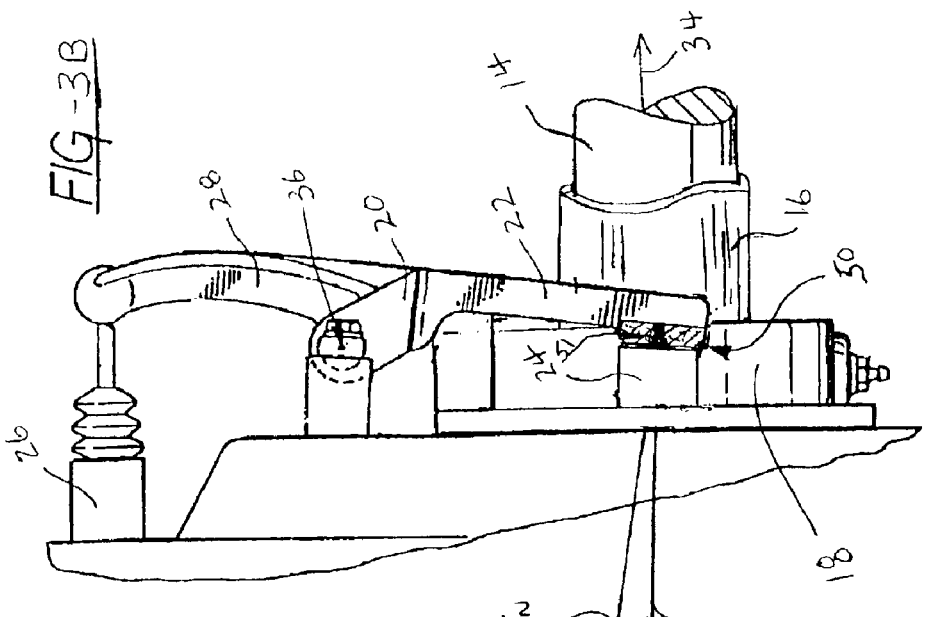
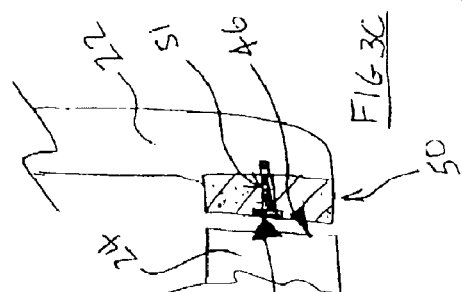
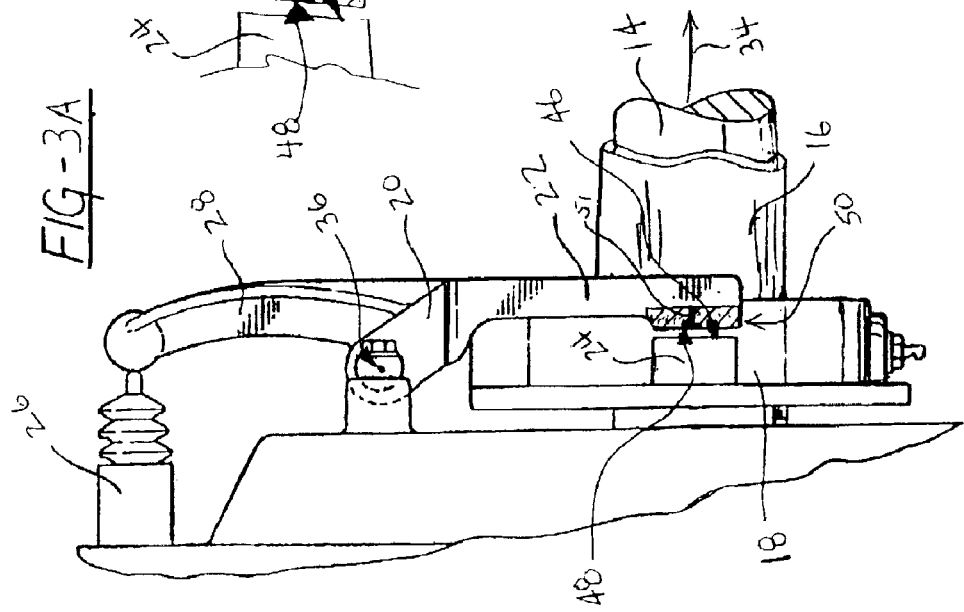

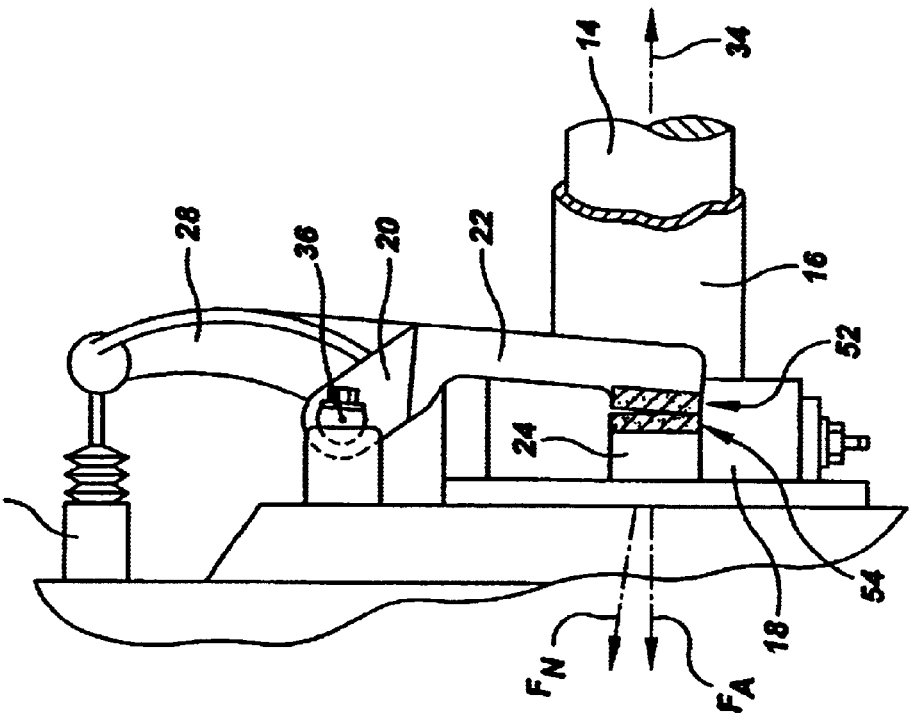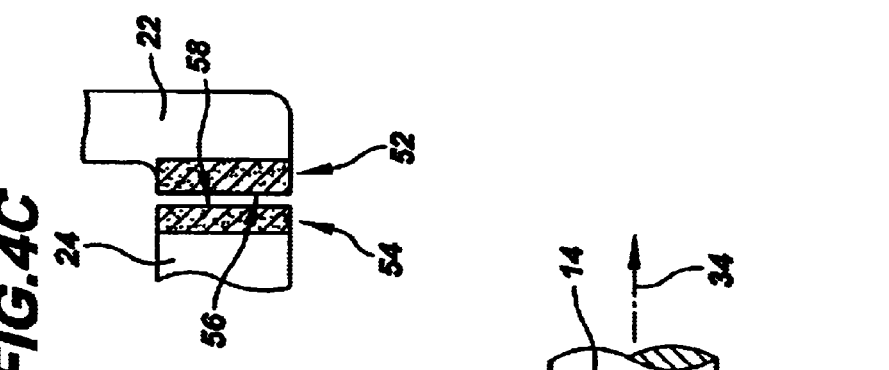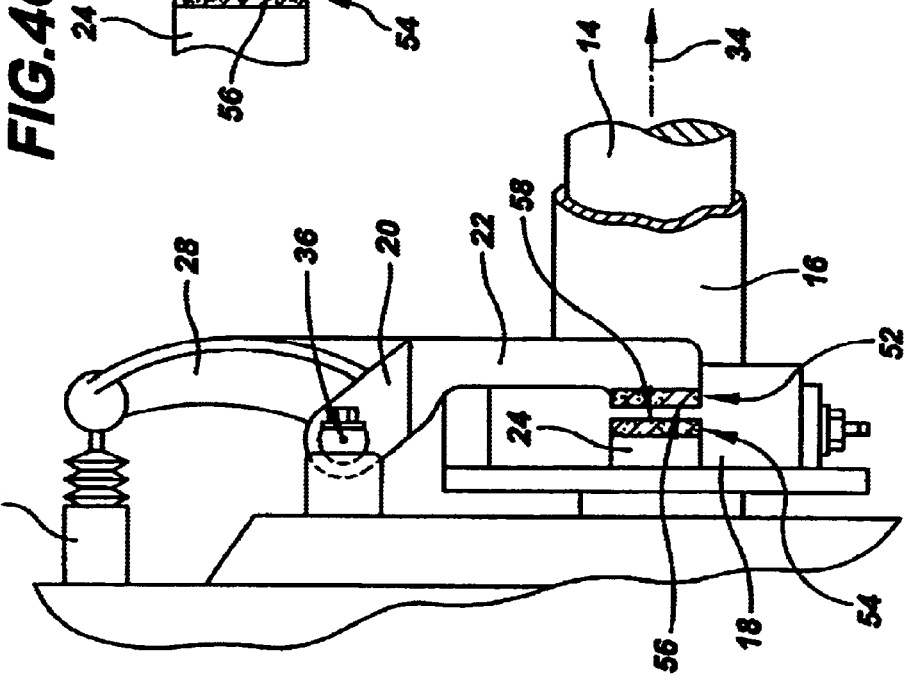

SELF-LUBRICATING RELEASE BEARING HOUSING

BACKGROUND OF THE INVENTION

This invention relates generally to a clutch release assembly for selectively coupling a clutch between an engine and a transmission of a motor vehicle.

Clutches for motor vehicles typically include a sleeve connected to a release bearing actuated by a clutch lever or fork. The sleeve engages clutch springs or levers that bias a clutch plate into engagement with a flywheel driven by the engine. The sleeve slides axially along and rotates with an input shaft of the transmission. A clutch release beating is disposed on the input shaft to engage the sleeve and transmit axial movement from the clutch fork. Typically, the clutch release bearing includes an inner race that rotates with the input shaft and the sleeve, and an outer housing or race that remains stationary relative to the inner race. Typically, the outer housing includes wear pads that are in contact with the clutch fork. The clutch fork is pivotally mounted to a housing and pivoted by an actuator in response to an operator depressing a clutch pedal. The clutch fork pivots to move the clutch release bearing axially along the shaft and thereby open the clutch.

The pivotal motion of the clutch fork in combination with frictional force between the fork arms and wear pads creates an uplift force on the clutch release bearing and sleeve. The uplift force is approximately equal to the coefficient of friction between the fork arms and the pads multiplied by the normal force applied to the arms against the pads. The uplift force presses the sleeve against the input shaft during clutch disengagements to accelerate wear of the shaft and clutch release bearing.

For this reason it would be desirable to design a clutch release bearing and fork actuation assembly that could further increase the life of the bearing sleeve by eliminating friction that induces uplift and accelerates wear.

SUMMARY OF THE INVENTION

An embodiment of this invention is a clutch release assembly including a clutch release housing axially movable along a shaft upon actuation of a release fork including a self-lubricating surface positioned between the release bearing housing and the release fork.

The clutch release assembly of this invention includes a clutch release bearing including a housing defining a pair of lugs disposed on either side of the housing. The lugs are acted upon by a release fork to move axially along a shaft. Movement of the release bearing engages a sleeve movable axially along the shaft. The sleeve actuates levers of the clutch assembly to disengage friction discs from a flywheel of the motor vehicle. The release fork is pivotally attached to a clutch housing for rotation about an axis to slide the clutch release bearing and release sleeve along the shaft.

The release fork includes an actuation arm and two engagement arms. The engagement arms include contact surfaces in contact with surfaces on the lugs of the clutch release bearing housing. The contact surfaces between the release fork and the lugs of the clutch release bearing housing comprise self-lubricating material to reduce friction caused by pivotal movement of the release fork. Pivotal movement of the release fork includes a non-axial force component. Non-axial force exerted by the release fork on the clutch release bearing exerts a moment force on the release sleeve that accelerates wear. Wear on the sleeve increases maintenance requirements and reduces the life of the release sleeve. Further, increased friction between the release fork and the clutch release assembly housing increases the force required to release the clutch.

A self-lubricating material is provided on one or both of the contact surfaces of the release fork and the clutch release bearing housing. In one embodiment of this invention, the self-lubricating material comprises oil impregnated powdered metal. Another embodiment of this invention includes a Teflon® impregnated polymer. Teflon® is a registered trademark of E. I. Du Pont de Nemours and Company, Wilmington. DE, for its brand of polytetrafluoroethylene (PTFE) fluoropolymer resins.

This invention includes embodiments where the self-lubricating material comprises the contact surface of the release fork, a portion of the lugs of the clutch release bearing housing, or on the contact surfaces of both the release fork and the clutch release bearing housing include self-lubricating material.

Preferably, the self-lubricating material for the various contact surfaces compose inserts attached to the release fork, the clutch release bearing housing, or both. The self-lubricating material substantially reduces wear on the release fork and release bearing housing and reduces frictional forces causing increased effort to actuate the clutch pedal.

The clutch release assembly of this invention includes self-lubricating material on the contact surfaces between the clutch release fork and clutch release housing, reducing friction to substantially reduce wear of the clutch release assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a side view of embodiment of the clutch release assembly in a non-actuated position;

FIG. 2B is a side view of the embodiment of FIG. 2A in an actuated position;

FIG. 2C is an enlarged view of the insert attached to the clutch release assembly;

FIG. 3A is a side view of another embodiment of the clutch release assembly in a non-actuated position;

FIG. 3B is a side view of the embodiment of FIG. 3A in an actuated position;

FIG. 3C is an enlarged view of the insert attached to the release fork;

FIG. 4A, is a side view of another embodiment of the clutch release assembly;

FIG. 4B, is a side view of the embodiment of FIG. 4A in an actuated position; and FIG. 4C is an enlarged view of inserts attached to both the clutch release housing and release fork.

DETAILED DESCRIPTION OF THE PREFERRED EMBODIMENT

Figure 1:
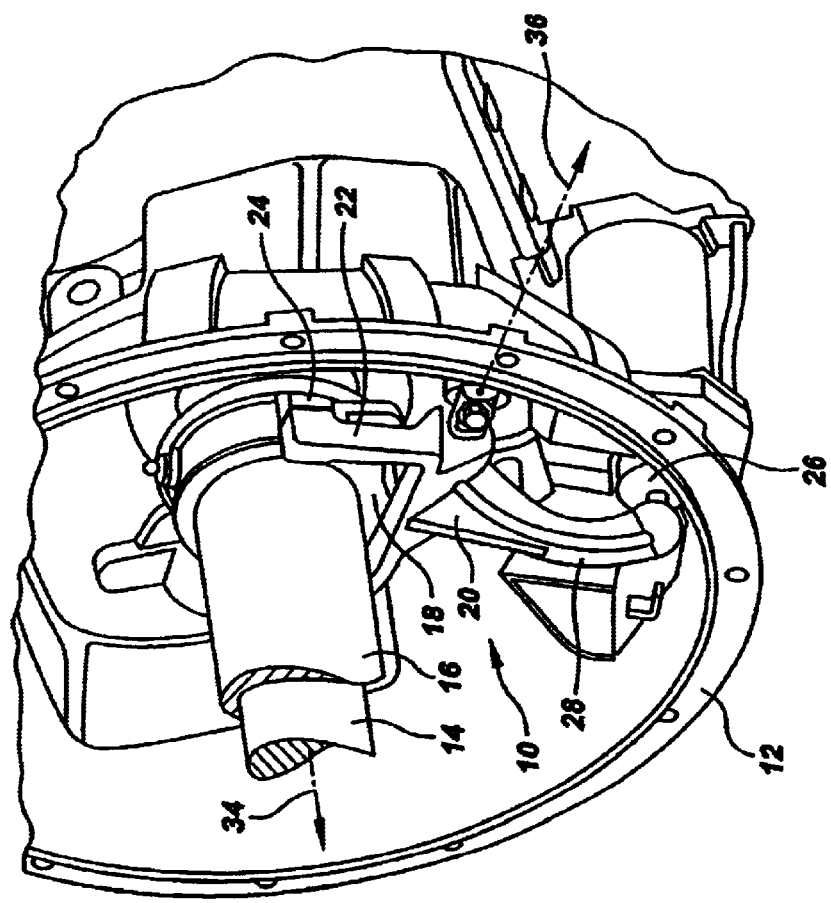
FIG. 1 is a perspective view of a clutch release assembly and fork.

A clutch release assembly for a clutch assembly is generally shown at 10 in FIG. 1. A clutch release fork 20 is mounted for pivotal movement about an axis 36. A clutch release bearing 18 moves along a shaft 14 in response to pivotal movement of the release fork 20. A release sleeve 16 attached to the clutch release bearing moves axially along the shaft 14 upon pivotal movement of the release fork 20. The clutch release assembly 10 is disposed within a clutch housing 12. The clutch release bearing 18 includes a pair of lugs 24 in contact with engagement arms 22 of the release fork 20. The release fork 20 also includes an actuation arm 28 attached to actuator 26. The release sleeve 16 moves axially along the shaft 14 in response to actuation of the release fork 20 to disengage clutch levers of the clutch assembly (not shown).

The actuator 26 pivots the release fork 20 into engagement with the lugs 24 of the clutch release bearing 18. Pivotal movement of the clutch release fork 20 about the axis 36 moves the clutch release bearing 18 axially along the shaft 34. Axial movement of the clutch release bearing 18 moves the sleeve 16, which in turn engages levers of the clutch assembly (not shown). The configuration of the clutch release assembly 10 shown in FIG. 1 is only one of many possible configurations within the scope of this invention. Any type of clutch release assembly including a clutch release fork engaged with a clutch release bearing would benefit from application of this invention.

The lugs 24 are disposed on either side of the clutch release bearing 18 and are in contact with the engagement arms 22 of the release fork 20. Referring to FIGS. 2A–C, the clutch release assembly 10 is shown including an insert 44 disposed on a lug 24 of the clutch release bearing 18. The insert 44 is secured to each lug 24 by a fastener 25. The insert 44 includes the contact surface 32 engaged to contact surface 30 of the release fork 20. The insert 44 is composed of a self-lubricating material. The self-lubricating material reduces friction between the contact surfaces 32 of the release bearing 18 corresponding with the contact surface 30 of the release fork 20.

In one embodiment of this invention, the insert 44 comprises an oil-impregnated powdered metal. Oil-impregnated powdered metal reduces friction at the contact surfaces 30, 32 between the clutch release fork 20 and the clutch release bearing 18. In another embodiment of this invention, the insert 44 comprises a Teflon® impregnated polymer. Again, the Teflon® impregnated polymer reduces friction at the contact surfaces 30, 32 between the release fork 20 and the clutch release bearing 18. Further, it should be understood that it is within the scope of this invention to use other self-lubricating materials as is known to a person of ordinary skill in the art.

Referring to FIG. 2B, the clutch release assembly 10 is shown in an actuated position where the clutch release fork 20 has been rotated about the axis 36 to move the clutch release bearing 18 along the axis 34. Movement of the clutch release bearing 18 along the axis 34 in turn moves the release sleeve 16 to engage or disengage clutch discs to a flywheel of the motor vehicle (not shown).

Arrows $F_A$ and $F_N$ illustrate the axial and normal components of force exerted by the clutch release fork 20 on the clutch release bearing 18. The force normal $F_N$ to the contact surface 30 is in a non-axial direction. Friction between the contact surfaces 30, 32 transmits the non-axial component of force, $F_N$, to the release bearing 18 and release sleeve 16 causing an uplifting force. The uplifting force increases wear on the release sleeve 16. Pivotal actuation of the clutch release fork 20 causes a slight lifting of the release bearing 18 and thereby the sleeve 16, increasing wear. The self lubricating material of the insert 44 substantially reduces friction between the two contact surfaces 30, 32 significantly reducing transmission of non-axial forces to the clutch release bearing 18 and release sleeve 16, which in turn reduces wear.

Referring to FIGS. 3A–3C, another embodiment of the clutch release assembly is illustrated where the self-lubricating material is positioned between the contact surfaces 48 and 46 as an insert 50 installed to the actuation arm 22 of the clutch release fork 20. In this embodiment the insert 50 is assembled to the clutch release fork 22 to engage the lug 24 of the clutch release bearing housing. The self-lubricating material comprising the insert 50 reduces the transmission of friction and reduces between the release fork 20 and clutch release bearing 18 to decrease wear on the clutch release bearing 18 and the release sleeve 16.

The insert 50 is attached by a fastener 51. The fastener 51 illustrated is a rivet, however, other types of fasteners, such as screws, press fir pins and the like are within the scope of this invention. Although this embodiment discloses the insert as a separate piece from the clutch release fork 20, it is within the scope of this invention that the insert 50 is an integral piece with the clutch release fork 20. In certain embodiments, the clutch release fork 20 is fabricated from plastic material allowing for the insert molding of the insert 50. In this way, extraneous fasteners are not required to attach and secure the insert 50 to the clutch release fork 20.

Referring to FIGS. 4A through 4C, the clutch release assembly of this embodiment includes self-lubricating material on both the clutch release housing 18 and the release fork 20. Insert 52 is attached to the release fork 20 and insert 54 is attached to the clutch release bearing 18. In this embodiment, each of the contact surfaces 56 and 58 comprise self-lubricating material to reduce friction during actuation of the clutch release fork 20.

The self-lubricating materials comprising inserts installed on the clutch release bearing 18 or the clutch release fork 20 are preferably formed from an oil-impregnated powdered metal or a Teflon® impregnated polymer. Further, other self-lubricating materials as known to a person of ordinary skill in the art are within the scope of this invention. The application of a self-lubricating material at the contact surfaces between the clutch release fork 20 and the clutch bearing assembly 18 substantially eliminated forces exerted in the non-axial direction on the clutch release bearing 18. Elimination of substantially all of the non-axial forces exerted on the clutch bearing 18 substantially increases the durability and life of the clutch release bearing 18 and the release sleeve 16.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A clutch assembly for a motor vehicle comprising:

a shaft;

a clutch release fork with a second contact surface;

a clutch release bearing movable axially along said shaft, said clutch release bearing including a first contact surface for engaging the second contact surface on the clutch release fork, said clutch release fork actuatable for moving said clutch release bearing axially along said shaft; and at least one insert of self-lubricating material secured to a respective at least one of said release bearing and said release fork by at least one fastener, said at least one insert forming a respective at least one of said first and second contact surfaces, wherein said self-lubricating material reduces transmission of pivotal forces from the clutch release fork which are directed non-axially when the clutch release fork pivots, wherein said self-lubricating material reduces wear on said clutch release bearing, and wherein friction is reduced during actuation of the release fork.

2. The assembly of claim 1, wherein said self-lubricating material is impregnated with a polytetrafluoroethylene fluoropolymer.

3. The assembly of claim 2, wherein said self-lubricating material forms both said first and second contact surfaces.

4. The assembly of claim 3, wherein said clutch release bearing includes a housing, said housing includes lugs, and each of said lugs includes said first contact surface.

5. The assembly of claim 1, wherein said self-lubricating material is oil-impregnated powdered metal.

6. The assembly of claim 1, wherein said self-lubricating material forms said first contact surface of said clutch release bearing.

7. The assembly of claim 1, wherein said self-lubricating material forms said second contact surface of said clutch release fork.

8. The assembly of claim 1, wherein each said at least one fastener is a threaded fastener.

9. The assembly of claim 1, wherein said insert is integrally molded into said clutch release bearing.

10. The assembly of claim 1, further including a pivotal connection between said release fork and a housing, such that pivotal movement of said fork axially moves said clutch release bearing to actuate said clutch assembly.

11. The assembly of claim 1, wherein said fork includes an actuation arm and engagement arms, and each of said engagement arms include said second contact surface engaged to said first contact surface of said clutch bearing.

12. The assembly of claim 1, further including a release sleeve corresponding to said clutch release bearing and movable along said shaft in response to movement of said clutch release bearing.

13. The assembly of claim 1, further including an actuator engaged to said release fork to pivot said clutch release fork.

14. A clutch assembly for a motor vehicle comprising:

a shaft;

a clutch release fork with an integrally molded insert of self-lubricating material forming a second contact surface; and a clutch release bearing movable axially along said shaft, said clutch release bearing including a first contact surface for engaging the second contact surface on the clutch relase fork, said clutch release fork actuatable for moving said clutch release bearing axially along said shaft;

wherein said self-lubricating material reduces transmission of pivotal forces from the clutch release fork which are directed non-axially when the clutch release fork pivots, wherein said self-lubricating material reduces wear on said clutch release bearing, and wherein friction is reduced during actution of the release fork.

15. The assembly of claim 14, wherein said self-lubricating material is impregnated with a polytetrafluoroethylene fluoropolymer.

16. The assembly of claim 14, wherein said self-lubricating material is oil-impregnated powdered metal.

17. The assembly of claim 14, wherein said self-lubricating material forms said first contact surface of said clutch release bearing.

18. The assembly of claim 14 further comprising an insert of self-lubricating material integrally molded into said clutch release bearing.

19. The assembly of claim 14, wherein said clutch release bearing includes a housing, said housing includes lugs, and each of said lugs includes said first contact surface.

20. The assembly of claim 14, further including a pivotal connection between said release fork and a housing, such that pivotal movement of said fork axially moves said clutch release bearing to actuate said clutch assembly.

21. The assembly of claim 14, wherein said fork includes an actuation arm and engagement arms, and each of said engagement arms include said second contact surface engaged to said first contact surface of said clutch bearing.

22. The assembly of claim 14, further including a release sleeve corresponding to said clutch release bearing and movable along said shaft in response to movement of said clutch release bearing.

23. The assembly of claim 14, further including an actuator engaged to said release fork to pivot said clutch release fork.

* * * * *